Figure 1:
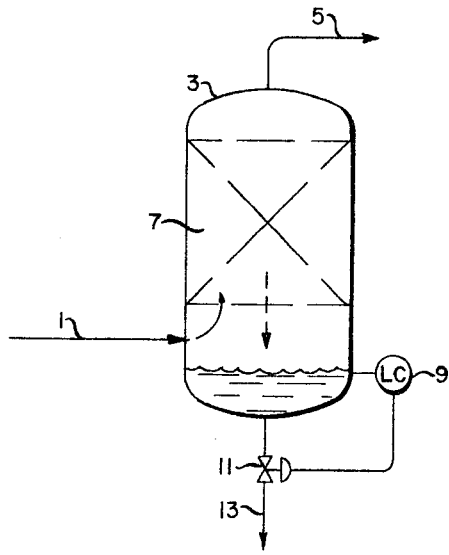

Aug. 23, 1966    L. C. FRUTH    3,268,456

SEPARATION PROCESS

Filed April 12, 1963    2 Sheets-Sheet 1

INVENTOR:
LORAINE C. FRUTH
BY Robert C. Clement
HIS ATTORNEY

United States Patent Office 3,268,456
Patented August 23, 1966

3,268,456
SEPARATION PROCESS
Loraine C. Fruth, Edwardsville, Ill., assignor to Shell Oil Company, New York, N.Y., a corporation of Delaware
Filed Apr. 12, 1963, Ser. No. 272,560
8 Claims. (Cl. 252—330)

This invention relates to a process for coalescing suspensions, emulsions, or foams. More particularly, this process relates to the resolution of suspensions, emulsions, or foams by contacting them with solid particles formed from two materials having different electron donating power and wherein one of said materials has been impregnated with the other.

An increasing area of importance in today's industrial complex is that of finding some economical way of disposing of the unwanted by-products or wastes which result from the chemical synthesis or physical separation of many commercial products, particularly those produced in the petroleum industry. In oil refineries, chemical plants, and transportation systems there are needs for faster and more economical methods for coalescing dilute suspensions or emulsions. Increasingly severe pollution control standards are beginning to dictate expenditures in the millions of dollars to eliminate suspended oil or chemicals from waste water. Suspended water in jet fuels is of major concern; accidental traces of surface-active materials in jet fuel inactivate the normal filter-coalescers so that suspended water remains in the fuel transported to the airfield where it provides a potential hazard to aircraft. Suspended water is also a problem in other fuels, oil products, and chemicals. The removal of catalysts frmo polymer solutions in the production of stereospecific rubbers or adhesives often involves some difficulty of removing finely divided droplets of wash solution. These problems and other relating to the resolution of emulsions, suspensions, and dispersions has been the subject of much investigation and research.

In the past, electrolytic principles have frequently been employed to break suspensions. Most electrolytic means of breaking suspensions have been based on the fact that coalescence of one phase may follow the passage of an externally induced electric current through the suspension (i.e., induced from without the suspension), usually in the form of a high potential alternating current; and such systems and variations thereof have been the source of several patents in this field.

Moreover, it is known in breaking water-oil emulsions to disperse finely divided metal particles in the suspension by agitation during passage of an extraneously produced electric current. For such a method, note U.S. Patent No. 1,827,714, issued Oct. 13, 1931, to Jacque C. Morrell. Therein, it is taught that metal, being a good conductor of electricity and being dispersed throughout the oil, substantially reduces the layer of oil through which the current may pass, thus facilitating the passage of the electric current generated by spaced electrodes on which a relatively high electrical potential difference is impressed.

Another improvement in electrical dehydration of oils is to use insoluble solid granules having water-wettable surfaces during the electrical treatment for the contacting of the minute particles comprising the dispersed substance, and to coalesce them into films coating the granules, and by reason of the heavier weight of the granules to carry the water films out of the electric field. This method is set forth in U.S. 2,030,198, by Marcel E. Cerf, issued Feb. 11, 1936. Another scheme is (set out in U.S. 2,045,465, issued June 23, 1936, to G. L. Hassler) to add a large concentration of granules to a dilute emulsion upon which a strong electric charge is induced to serve as nuclei for the condensation of water from the emulsion and whereby their charge and lively agitation causes them to continually shake off drops of agglomerated water before they reach excessive (i.e., wherein chaining occurs) size.

Although devices and modifications such as the above, have served some purposes, they have not proved entirely satisfactory under all conditions of service for the reasons that considerable expense is involved in the equipment used, and apparatus of this type has an inherent lack of flexibility. That is, the apparatus or unit employed has certain physical limitations which limit the flow rate, type of suspension or stream which may be treated, etc.

Recently, it was discovered that it is possible to spontaneously coalesce colloidal dispersions of solids in a gas, solids in a liquid, liquids in a gas, liquids in a liquid, i.e., sols, emulsions, suspensions, or entrained gases (all of which are hereinafter referred to as "suspensions") by contacting the suspension with a bed of solid particles comprising a mixture of at least two different substances having a difference in electron withdrawing or donating power. This "spontaneous" (i.e., without the employment of an external electromotive force source) coalescence may be accomplished by "contacting," i.e., either (1) by passing the suspension or emulsion to be coalesced through the bed particles or (2) by passing the bed particles through the suspension or (3) by combinations of both (1) and (2). This new, flexible and inexpensive electrolytic process for the breaking and agglomerating of suspensions in process and/or waste streams which does not require the application of any external electrical force is set forth in the Fowkes and Anderson patent application Serial No. 210,947, filed July 19, 1962, now abandoned.

While the process as disclosed in the above application has proved to have substantial advantages over previously known processes, its practical application in some situations has been somewhat lessened by the discovery that under certain conditions of turbulent flow, or less turbulent flow but over periods of prolonged contacting times the particles tend to segregate as to types and the effectiveness of the spontaneous coalescence usually achieved is diminished.

Now, in accordance with the instant invention, it has been discovered that it is possible to improve the life or extend the period of usable contact time during which the bed particles are effectively able to coalesce or resolve a suspension such as herebefore defined by employing finely divided bed particles wherein each particle is made up of at least two different materials having different electron donating powers or withdrawing capacities and wherein the particles are formed by the impregnating or infusing of one of said materials with the other said material. Improved efficiency of separation is achieved with the avoidance of the tendency of the particles to separate into groups of the same type by using particles as above described.

That this is possible, without a substantial reduction of effectiveness in the degree of separation achieved when separate particles of different species are employed, is quite surprising in view of the fact that it is believed that the difference in electron donating or withdrawing power between the two different substances resulted in an electric field being established by virute of a positive charge being developed on the surface of one substance of the bed and a negative charge on the surface of the other substance of the bed. Thus, even though the particles are formed by fusing or impregnating the different substances so that both types of substances are in contact with each other, the influence of the field is apparently not substantially dissipated; moreover, separation of the agglomeration or suspension being treated is possible without the above noted disadvantages present when mixtures of particles are employed wherein each particle is derived from entirely one substance.

The principal advantages of the instant invention are that the instant process is (1) easier to use because problems associated with mixing the particles to form the bed and establishing an equal distribution of particles throughout the bed is obviated, and (2) the bed does not tend to segregate as to particle type or rearrange itself by the accumulation or settling of one type of material into pockets in which the other type of material is not present.

Figure 2:
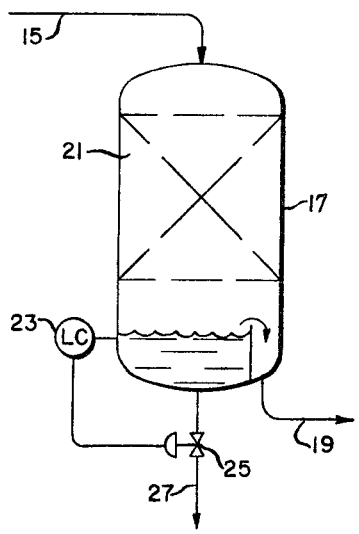
Figure 3:
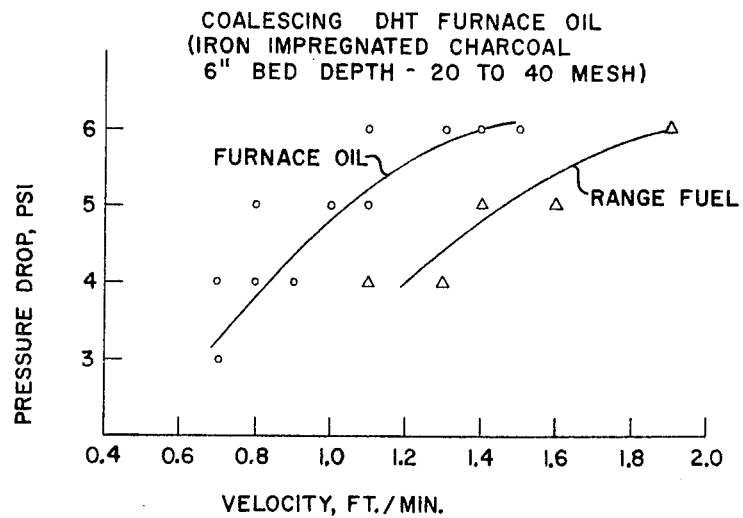
Figure 4:
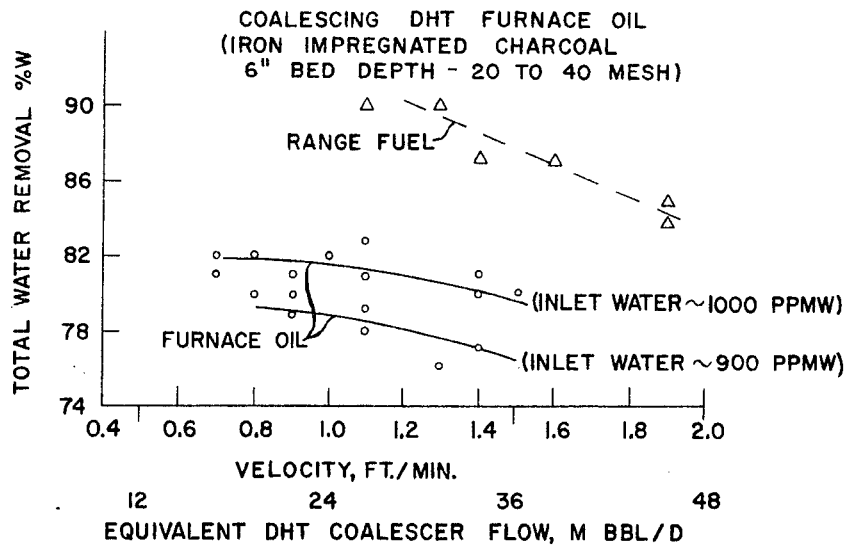

Other features and advantages of the instant invention will become apparent from the following description and the annexed drawing, which consists of four figures: FIGURE 1, illustrating a conventional upflow coalescer arrangement; FIGURE 2, illustrating a downward flow variation; FIGURE 3, showing a plot of pressure drop in the bed versus flow velocity of furnace oil and range fuel treated by an embodiment of the instant process; and FIGURE 4, illustrating the effectiveness of coalescence of an iron impregnated charcoal bed in treating range fuel and furnace oil haze.

Referring to FIGURE 1, the cloudy suspension to be treated comprising a small amount of water dispersed in kerosene, is introduced through line 1 into the column 3. The liquid introduced flows upward contacting and passing through the bed 7 composed of impregnated particles formed from two different substances having different electron donating capacities (for example, 20–40 mesh size particles of carbon impregnated with iron). The droplets containing substantially only water coalesce on the bed particles and are thereby removed from the upflowing feed. The latter is removed as a clear hydrocarbon phase from line 5. The coalesced water droplets pass downwardly through the bed and into the settling zone in the bottom of the column 3. The water may then be removed through line 13 by means of a conventional liquid level controller 9 and valve 11.

FIGURE 2 illustrates a downward flow variation of the inventive process. In this embodiment a cloudy water-in-kerosene suspension is introduced to the column 17 and into the bed of particles contained there 21, by means of line 15. Then the suspension passes downwardly through the bed with the water coalescing into droplets. The droplets of water and kerosene then flow downwardly to the bottom of the column to a settling zone from which the water is removed as a separate phase through line 27 by means of valve 25 and liquid level controller 23 and the clear kerosene is recovered from line 19.

All materials or substances which have a difference in electron donating or withdrawing power are suitable to use as the "two different" materials forming the individual bed particles in the instant invention. Particularly desirable components which may be impregnated one with the other are metals and/or metal alloys and/or oxides, and the like, metals or metal alloys or metal oxides impregnated with non-metals, e.g., carbon-iron, carbon-aluminum, carbon-silver, and the like; and impregnation of two non-metals, e.g., carbon with iodine, phosphorus with carbon, nylon with polypropylene, glass with polyethylene, wool with Teflon, and the like.

Examples of those metals which are suitable for use in the instant invention are: Li, K, Ca, Na, Mg, Al, Zn, Cr, Fe, Cd, Ni, Sn, Pb, Sn, Cu, Hg, Ag, and Mn. Particularly desirable impregnated combinations of substances are those in which the two individual substances which are impregnated have a sufficient difference in electron donating or withdrawing capacity such that their relative (i.e., the arithmetic difference in electrode potential) electrode potential exceeds about 1 volt. The electrode potential of many of the suitable materials may be determined by reference to the Electromotive Forces Series of Elements, such as found on pages 1521, of "The Handbook of Chemistry and Physics," thirty-second edition.

When the materials used are non-metals not set forth in the Electromotive Force Series, one may employ any two different substances (such as synthetic or natural fibers) selected from the triboelectric series (reported in the June 26, 1961, issue of "Chemical Engineering," pages 108–110). Particularly, such solid fibers as wool; glass, synthetic polyamides of the nylon family, i.e., copolymers of polyalkylene diamines and dibasic carboxylic acids, such as condensation polymers of hexamethylene diamine and adipic acid, or sebacic acid and the like; polyamides derived from caprolactam, etc.; polyamides derived from omega-aminoundecanoic acid, and the like, and other commercially available synthetic naturally occurring polymers; fluorinated polymers such as polytetrafluorethylene, polychlorotrifluoroethylene, polydifluoroethylene, polychlorodifluoroethylene, etc.; cotton; polypropylene; polyethylene; and the like may be used. When the non-metals employed are polymers, it is preferred that they be of a molecular weight sufficient for their being solids, i.e., their molecular weight may range from as low as a few thousand (e.g., 7,000) up to about $10^6$.

As previously mentioned, the suspension which may be treated by the employment of the instant invention includes colloidal suspensions, water and oil (hydrocarbon or non-hydrocarbon) emulsions, entrained gases, etc. In general, any system wherein electrically charged particles, droplets or gas bubbles are present in liquids may be advantageously treated. Desirable for treatment are dilute aqueous petroleum refinery waste emulsions, carbon-in-oil suspensions, dilute water-in-oil emulsions, or hazes such as that formed in the residual aqueous wash water used in the removal of catalyst by extraction and washing techniques from polymer solutions, and in smokes, mists, etc. Also, particularly preferred is the treatment of dilute emulsions (sometimes referred to as "hazes") of water in kerosene (i.e., jet fuel haze) and other water and light hydrocarbon emulsions, such as water in liquid propane. This process may additionally be employed in desalting of fluid crude oils.

The specific process variables may obviously be modified depending upon the suspension being treated and the particular substances making up the bed; but, for any given system and degree of separation required, these variables are readily determined by those of ordinary skill in the art.

The average particle size of the particles used in the bed may generally vary between wide limits in the instant process; conventional bed packing sizes such as from about 60 mesh up to about one inch may be used. A particularly desired size range is from about 5 to about 40 mesh. The relative proportion of the types of substances employed to make up the individual impregnated particle may vary within wide ranges with about a one-to-one volume ratio most preferred; however, volume ratios of from about 1:25 to about 25:1 may also be utilized.

The manner by which the individual particles making up the bed are formed may be any conventional method of impregnating or infusing two materials. In one way, particles of a non-metal such as carbon, are soaked with a metal salt solution such as a concentrated aqueous ferric nitrate solution. The soaked particles are heated to dry, then roasted at an elevated temperature and pressure to convert the ferric nitrate to iron oxide; and, finally, treated with hydrogen or other reducing gas or vapor under temperatures and pressures sufficient to reduce the iron oxide in situ on the carbon particle so that free iron is distributed randomly on the surface.

While the method described is for producing impregnated iron on carbon, combinations of the other substances having different electron donating properties such as those substances specifically listed in columns 3 and 4 may be achieved through other well known methods of impregnating substances so long as the surface of the particle as finally produced is such that both types of materials are exposed to some extent on the surface of each particle.

Moreover, a suitable carbon-iron oxide bed may be comprised of particles of activated carbon which contains iron present as the oxide. A particularly desirable example of this latter type of particle is a granular activated carbon prepared from coconut charcoal which contains iron present as the oxide (i.e., approximately 4% $Fe_3O_4$) which is usually available in the form of 8–30 mesh particles.

*Example I*

As one example, a 200–ml. volume quantity of carbon particles of 20–40 mesh particle size which have been pretreated under a vacuum to evacuate the air volume present in the particles is soaked with a saturated aqueous ferric nitrate solution at ambient temperature. The soaked carbon particles are then heated for a time and temperature sufficient to achieve dryness. Following the drying, the particles are roasted by heating the mixture in the presence of a nitrogen atmosphere at about 50 p.s.i.g. at a rate of about 50° F./hour until a temperature of about 800° F. is reached. At this elevated temperature hydrogen gas is flowed into the system at a rate of about 5 ft.$^3$/hr. std. and the temperature is maintained at about 800° F. (at about 50 lbs. p.s.i.g.) for about six hours. Following this the heated particles are allowed to cool to ambient temperature in the presence of hydrogen. The resultant impregnated particles contain both carbon and free iron on the surface and are suitable for the practice of the instant invention.

The apparatus employed in this process may be any conventional or convenient type known to those skilled in the art. Following the bed, any type of conventional separation device may be employed at the exit, such as a settler, hydroclone, etc. Any other auxiliary equipment such as valves, by-passes, controlling devices, etc., that may be necessary for the proper operation of the process may be employed; the inclusion of which will be evident to those skilled in the art.

While most of the description of the instant process above has been directed to the situation where a liquid suspension is "contacted" with the bed particles by passing the liquid through a stationary bed, it is apparent that the bed particles may be circulated through the liquid by means of conventional stirring devices, shakers, etc., to achieve a similar effect; and the term "contacted" should be construed to include all of these means.

While in any given application, the bed size is a function of the residence time and the velocity of the material passing through the bed, these factors also may vary within wide values. For example, it is generally desirable to have a minimum residence time of about 0.1 second up to any residence time desired. However, a preferred range is from about 3 seconds to 5 minutes. The velocity, of course, will be fixed by the bed size and the particular residence time desired; however, the general operating velocity may vary from about 0.1 foot per minute and lower up to about 10 feet per minute and higher. The most desirable range of velocities employed are from about .5 to about 3 feet per minute.

The invention is further illustrated, but not limited by the following specific examples of the inventive process.

*Example II*

A dilute water-in-kerosene emulsion was produced by steaming kerosene containing about 50 parts of sodium dodecylbenzene sulfonate per million parts kerosene (by weight) until a stable water haze having a concentration of about 1000 parts of suspended water per million parts of emulsion (by weight) was obtained. The turbidimeter reading of a sample of the emulsion thus formed indicated 21% transmission of incident light. The emulsion was then passed at a flow rate of about 250 milliliters per minute through a column (approximately 2 centimeters in diameter by 2 centimeters) packed with 8–30 mesh particles of granular activated carbon containing about 4% $Fe_3O_4$. The effluent recovered had a turbidimeter reading of 98% transmission of incident light, indicating successful resolution of the emulsion.

*Example III*

A hydrodesulfurized gas oil boiling from about 380 to 650° F. and containing about 1000 parts per million (by weight) water was passed through a 6-inch bed containing 20 to 40 mesh particles of iron impregnated charcoal prepared substantially the same as that of Example I at a flow rate of about one foot per minute. Examination of the effluent revealed that about 82% (by weight) of the water present initially was removed.

*Example IV*

Another hydrocarbon oil emulsion similar to that described in Example II except that it contained about 900 parts per million (by weight) of water was passed through a bed of iron impregnated charcoal as described in Example III except that a flow rate of 1.1 feet per minute was employed. The passage through the bed was effective to remove 78% of the water originally present in the emulsion.

*Example V*

An emulsion prepared in the same manner as in Example II was passed through the bed described in Example III at a rate of .7 foot per minute. 82% of the original water present was removed.

*Example VI*

A range fuel hydrocarbon boiling in the range of about 350 to 520° F. and containing a small amount of water was passed through a bed similar to that described in Example III at a flow rate of about 1.9 feet per minute. The water removal was about 84% by weight of the total inlet amount.

I claim as my invention:

1. A process for coalescing and agglomerating a suspension of water in a liquid hydrocarbon comprising contacting the suspension, for a residence time of 0.1 second up to about 60 seconds, with particles of two finely divided solids, one comprising iron and one comprising carbon, each of said particles being formed by impregnating one solid with the other solid, to produce two substantially separate phases.

2. The process of claim 1 wherein the suspension is a petroleum refinery waste stream.

3. The process of claim 1 wherein the suspension is a water-in-oil emulsion.

4. The process of claim 1 wherein the impregnated particles are iron impregnated carbon.

5. The process of claim 1 wherein the impregnated particles are activated carbon containing iron oxide.

6. The process of claim 1 wherein the impregnated particles are produced by soaking carbon particles in concentrated aqueous ferric nitrate, drying the particles, roasting, and reducing with hydrogen.

7. A process in accordance with claim 1 wherein said two substantially separate phases are subsequently recovered.

8. A process in accordance with claim 1 wherein the finely divided particles have a particle size of from about 60 mesh up to about 1 inch.

(References on following page)

References Cited by the Examiner

UNITED STATES PATENTS

| | | | |
|---|---|---|---|
| 1,569,695 | 1/1926 | Zoul | 208—188 |
| 1,887,774 | 11/1932 | Meinzer | 208—188 |
| 2,036,258 | 4/1936 | Cummins | 252—324 |
| 2,232,294 | 2/1941 | Urbain et al. | 252—324 |
| 2,305,550 | 12/1942 | Nixon et al. | 252—324 |
| 3,016,345 | 1/1962 | Price | 208—187 |

LEON D. ROSDAL, *Primary Examiner.*

JULIUS GREENWALD, *Examiner.*

H. B. GUYNN, *Assistant Examiner.*